United States Patent Office 3,828,024
Patented Aug. 6, 1974

3,828,024
POLY(AZIRIDINE)S
David S. Breslow, Wilmington, Del., assignor to Hercules Incorporated, Wilmington, Del.
No Drawing. Continuation-in-part of abandoned application Ser. No. 100,509, Dec. 21, 1970. This application June 29, 1972, Ser. No. 267,326
Int. Cl. C07d 23/06
U.S. Cl. 260—239 E                5 Claims

ABSTRACT OF THE DISCLOSURE

The bis(aziridinyl) compounds containing electron withdrawing groups in the aziridinyl rings are described. Typical electron withdrawing groups are carboalkoxy, aroyl, cyano, aryl, and substituted aryl groups. These compounds are useful as cross-linking agents for polymers containing ethylenic unsaturation.

---

This application is a continuation-in-part of my copending application Ser. No. 100,509, filed Dec. 21, 1970 and now abandoned.

This invention relates to new poly(aziridinyl) compounds and more particularly to bis(aziridinyl)s.

It is well known that certain poly(aziridinyl) compounds will react with the carboxyl group of carboxyl terminated polymers and effect cross-linking. Such compounds are the tris(aziridinyl) phosphine oxide or sulfides, the tris(aziridinyl) triazines, and the tris(aziridinyl) triphosphatriazines. It is further known that polyolefins can be cross-linked using a combination of such poly(aziridinyl) compounds with peroxide curing agents.

Now in accordance with this invention, a new class of poly(aziridinyl) compounds has been discovered, which compounds are useful for cross-linking ethylenically unsaturated polymers. These poly(aziridinyl) compounds have the formula

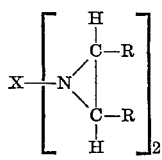

where X is an organic radical selected from the group consisting of alkylene, cycloalkylene, alkylene-cycloalkylene-alkylene, cycloalkylene-alkylene-cycloalkylene, alkylene-amino-alkylene, alkylene-thio-alkylene, alkylene-sulfone-alkylene, alkylene-oxyalkylene and alkylene-arylalkylene radicals containing from about 2 to about 20 carbon atoms and at least one R is an electron withdrawing group selected from carboalkoxy, aroyl, cyano, aryl, alkaryl, and aryl radicals substituted with an electron withdrawing substituent selected from halogen, nitro, cyano, and carboalkoxy substituents, which R substituents on the aziridinyl ring can be alike or different, or one R can be hydrogen. Where R is not hydrogen it will generally contain from about 1 to about 18 carbon atoms.

These new bis(aziridinyl) compounds have been found to be effective cross-linking agents for ethylenically unsaturated polymers wherein the ethylene double bonds are those of a vinyl group or those that are activated as, for example, by a carboxyl group such as is found in the condensation polymers of bisphenol A, propylene oxide, and fumaric acid. Polymers containing a strained ethylene double bond as in norbornene polymers or cyclobutene polymers can also be cross-linked with these bis(aziridinyl) compounds. The cross-linking reaction that takes place is through the double bonds and is not due to any reaction with carboxyl or other such end groups.

The method by which the new bis(aziridinyls) of this invention are prepared will in large measure depend on the substituents desired in the 2- and/or 3-positions of the aziridinyl ring. One method of preparing these compounds is by reacting a suitable dibromo compound with a diamine. The reaction that takes place is illustrated by the following equation

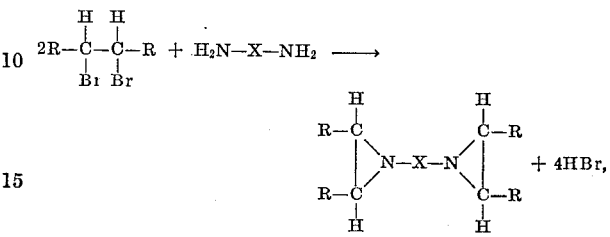

where R and X are as defined above. Thus, for the preparation of a bis(aziridinyl) having a cyano group in the 2-position one would react 2,3-dibromopropionitrile with a suitable diamine. Exemplary of the dibromo compounds that can be reacted with a diamine to produce the bis(aziridinyl) compounds of this invention are:

2,3-dibromopropionitrile;
2,3-dibromo-3-phenyl-propionitrile;
methyl 2,3-dibromo-3-phenylpropionate;
methyl 2,3-dibromopropionate;
ethyl 2,3-dibromopropionate;
isopropyl 2,3-dibromopropionate;
diethyl 2,3-dibromosuccinate;
2,3-dibromo-1,4-diphenyl-butan-1,4-dione;
1,2-dibromo-1-phenylethane;
1,2-dibromo-1,2-diphenylethane;
1,2-dibromo-1,2-bis(4-chlorophenyl)ethane;
1,2-dibromo-1,2-bis(4-nitrophenyl)ethane;
1,2-dibromo-1,2-bis(4-cyanophenyl)ethane;
2,3-dibromo-1,3-diphenyl-propan-1-one;
2,3-dibromo-1-phenyl-3-(4-nitrophenyl)propan-1-one;
2,3-dibromo-1-phenyl-3-(4-bromophenyl)-propan-1-one;
etc.

The bis(aziridinyl)s of this invention containing an aroyl group attached to the aziridinyl ring can also be prepared by the reaction of an unsaturated ketone with the diamine, as for example, benzalacetophenone with a diamine and iodine or bromine.

The bis(aziridinyl)s having a carboalkoxy group on the aziridinyl ring can be prepared by reacting an α-halo ethylenically unsaturated carboxylic acid ester with a diamine, as for example, methyl α-bromo acrylate, isopropyl α-bromoacrylate, etc., with a diamine.

Any suitable diamine can be used in the above preparations, as for example, ethylenediamine, 1,3-diaminocyclohexane, trimethylenediamine, tetramethylenediamine, 4,4′-methylene-bis(cyclohexylamine), 1,7 - diamino-4-thia-heptane, pentamethylenediamine, decamethylenediamine, m- and p-xylylenediamine, 1,7-diamino-4-methyl-4-aza-heptane, etc.

The preparations are generally carried out in the presence of a solvent for the reactants, as for example, aliphatic, cycloaliphatic and aromatic hydrocarbons that are free of aliphatic unsaturation, such as heptane, cyclohexane, benzene, etc. The reaction will usually be carried out at room temperature, but can be carried out at any temperature from about 15° C. to about 100° C.

Typical bis(aziridinyl)s of this invention are 1,6-bis(2-cyanoaziridin-1-yl)hexane,
1,4-bis(2-cyano-3-phenylaziridin-1-yl)butane,
1,4-bis(2-carbomethoxy-3-phenylaziridin-1-yl)cyclohexane, 1,4-bis(2-carbomethoxyaziridin-1-yl)pentane,
1,8-bis(2-carboethoxyaziridin-1-yl)octane,
1,3-bis(2-carboisopropoxyaziridin-1-yl)-2,2-dimethylpropane,
4,4'-bis(2,3-dicarboethoxyaziridin-1-yl)methylenedicyclohexane,
1,3-bis(2,3-dibenzoylaziridin-1-yl)cyclopentane,
1,2-bis(2-phenylaziridin-1-yl)ethane,
α,α'-bis(2,3-diphenylaziridin-1-yl)-hexahydro-p-xylene,
1,10-bis[2,3-bis(4-chlorophenyl)aziridin-1-yl]decane,
1,3-bis[2,3-bis(4-nitrophenyl)aziridin-1-yl]-2,2,4,4-tetramethylcyclobutane,
2,8-bis[2,3-bis(4-cyanophenyl)aziridin-1-yl]nonane,
1,4-bis(2-benzoyl-3-phenylaziridin-1-yl)pentane,
1,5-bis[2-benzoyl-3-(p-nitrophenyl)aziridin-1-yl]pentane,
1,3-bis(2-benzoyl-3-(4-bromophenyl)aziridin-1-yl)cyclohexane,
1,6-bis[2-(p-methylbenzoyl)-3-(α-naphthyl)aziridin-1-yl]hexane,
1,8-bis[2-phenyl-3-(3-n-amylphenyl)aziridin-1-yl]menthane,
1,4-bis[2-carboisobutoxy-3-(p-t-butylphenyl)aziridin-1-yl]butane,
1,7-bis(2-cyanoaziridin-1-yl)-4-methyl-4-azaheptane,
1,7-bis(2-cyano-3-phenylaziridin-1-yl)-4-oxaheptane,
1,7-bis(2-benzoyl-3-phenylaziridin--1-yl)-4-thiaheptane,
1,7-bis(2-benzoyl-3-phenylaziridin-1-yl)-4-thiaheptane-4,4-dioxide,
and α,α'-bis(2-carbomethoxyaziridin-1-yl)-m-xylene.

The following examples will illustrate the preparation of the bis(aziridinyl) compounds of this invention and their use in cross-linking ethylenically unsaturated polymers. All parts and percentages are by weight unless otherwise indicated.

Example 1

A solution of 100 parts of methyl α-bromoacrylate, 35 parts of hexamethylene diamine, and 63 parts of triethylamine in 1150 parts of benzene is stirred for 18 hours at room temperature. Filtration to remove triethylamine hydrobromide and evaporation of the solvent gives 90 parts of crude product which is purified by liquid-solid chromatograph using alumina, giving 35 parts of 1,6-bis-(2-carbomethoxyaziridine-1-yl) hexane of melting point 40° C. Elemental analysis gives 60.2% carbon, 9.03% hydrogen, and 9.42% nitrogen, where the calculated values are 59.1% carbon, 8.52% hydrogen, and 9.85% nitrogen.

To a solution of 100 parts of a commercial condensation polymer of bisphenol A, propylene oxide and fumaric acid (containing about 7 fumarate double bonds per molecule) in 100 parts of ethyl acetate is added 17 parts of the above-prepared 1,6-bis(2-carboxmethoxyaziridine-1-yl) hexane. The solution is heated in a sealed vessel at 160° C. for 0.5 hour whereupon the polymer is completely insolubilized, demonstrating that it has been cross-linked. No insolubilization of the polymer occurs on so heating a control sample to which none of the aziridinyl compound has been added.

Example 2

To a solution of 65 parts of 2,3-dibromopropionitrile in 88 parts of benzene held at 5–10° C. is added slowly 71 parts of triethylamine followed by 11.1 parts of 1,3-diaminopropane. The reaction mixture is allowed to warm to room temperature during 0.5 hour and then is stirred for 3 hours at reflux temperature. The triethylammonium hydrobromide (113 parts, 98%) is removed by filtration and the benzene diluent is removed on a rotary evaporator. The 1,3-bis(2-cyanoaziridine-1-yl) propane decomposes with gas evolution at 200° C. under 0.5 mm. pressure.

Example 3

A solution of 14 parts of hexamethylenediamine and 49 parts of triethylamine in 22 parts of benzene is added slowly to a solution of 50 parts of benzalacetophenone and 61 parts of iodine in 44 parts of benzene. The iodine color disappears after one hour of stirring at room temperature. The precipitated triethylamine hydriodide is removed by filtration. The filtrate is washed twice with water and then with a saturated aqueous sodium chloride solution. The diluent is removed on a rotary evaporator. There is obtained 57 parts of a dark-colored oil which partially crystallizes on standing at 5° C. The nuclear magnetic resonance spectrum of the product is consistent with the structure of 1,6-bis(2-benzoyl-3-phenylaziridine-1-yl) hexane.

Example 4

To 27 parts of α,α'-(1,2-diphenyl-2-hydroxyethylamino)hexahydro-p-xylene in 500 parts of chloroform is added 22 parts of phosphorus pentachloride in small portions with stirring. The mixture is stirred for three days at room temperature and the solid is then filtered and dried in vacuo. This is then suspended in 600 parts of ethanol and 35 parts of potassium hydroxide dissolved in 300 parts ethanol is added with stirring. After stirring overnight, the reaction mixture is poured into two liters of water, the reaction product is separated, washed thoroughly with water and dried in vacuo. The material thus isolated has a nuclear magnetic resonance spectrum consistent with that expected for: α,α'-bis(2,3-diphenylaziridin-1-yl)-hexahydro-p-xylene. Its formula can be shown as follows:

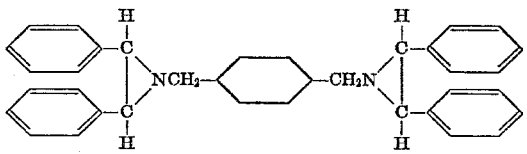

Example 5

A solution of 8.8 parts of 1,4-diaminobutane and 20.2 parts of triethylamine in 120 parts dry benzene is added slowly, with stirring and cooling to a solution of 44.4 parts of 3-(p-tolyl)-2-bromoacrylonitrile in 300 parts benzene. The reaction is maintained at 0–5° C. After stirring for three days at room temperature, the precipitated triethylamine hydrobromide is filtered off, the filtrate is concentrated in vacuo and the residue recrystallized from cyclohexane. The nuclear magnetic resonance spectrum corresponds with the structure 1,4-bis[2-cyano-3-(p-tolyl)-aziridin-1-yl]butane

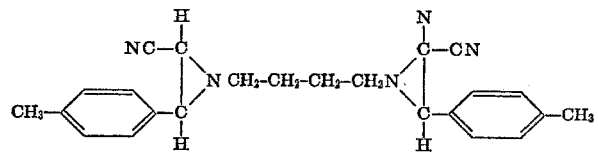

Elemental analysis gives 14.8% nitrogen, where the calculated value is 15.1%.

Example 6

A mixture of 16.4 parts of m-xylylene diamine, 24.4 parts of triethylamine, and 120 parts benzene is added over 1.5 hours to an ice bath-cooled, mixture of 40.0 parts of methyl-2-bromoacrylate and 325 parts of benzene with stirring. The reaction mixture is kept 8 days at room temperature. Salts and water-soluble components of the reaction mixture are removed by filtration and thorough washing with water. Evaporation of benzene in a vacuum gives a product whose nuclear magnetic resonance and infrared spectra are those expected of α,α'-bis(2-carbomethoxyaziridin-1-yl)-m-xylene, which can be shown as follows:

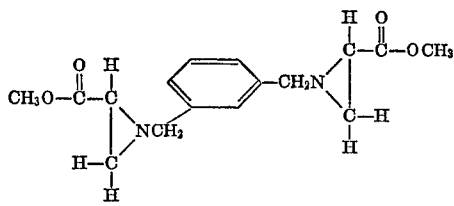

Example 7

A mixture of 5.8 parts of 1,7-diamino-4-thiaheptane, 8.0 parts of triethylamine, and 40 parts of chlorobenzene is added over a period of one hour to an ice bath-cooled, stirred mixture of 20 parts of 2-bromo-3-p-nitrophenyl-acrylonitrile and 160 parts of chlorobenzene. After 20 hours at room temperature, salts and water-soluble components are removed by filtration and washing with water. Evaporation of the chlorobenzene gives a product whose nuclear magnetic resonance and infrared spectra are those expected of 1,7-bis(2-nitrophenyl-3-cyanoaziridin-1-yl)-4-thiaheptane, which can be shown as follows:

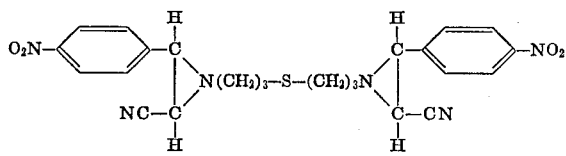

Example 8

Example 4 is repeated substituting 34 parts of α,α'-(1,2-bis-o-chlorophenyl-2-hydroxyethylamino)hexahydro-p-xylene for the α,α'-(1,2-diphenyl-2-hydroxyethylamino) hexahydro-p-xylene. The resulting product has infrared and nuclear magnetic resonance spectra consistent with the structure α,α'-bis(2,3-bis-o-chlorophenylaziridin-1-yl) hexahydro-p-xylene

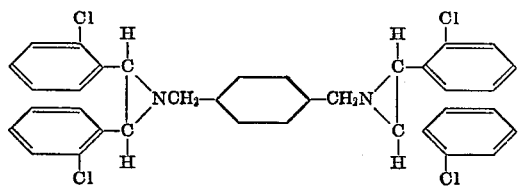

Example 9

A mixture of 25.2 parts of 4,4'-methylene-bis(cyclohexylamine), 24.4 parts of triethylamine, and 120 parts benzene is added over 1.5 hours to an ice bath-cooled mixture of 43.0 parts of ethyl-2-bromoacrylate and 325 parts of benzene with stirring. The reaction mixture is kept 8 days at room temperature. Salts and water-soluble components of the reaction mixture are removed by filtration and washing with water. Evaporation of the benzene in a vacuum gives a product whose nuclear magnetic reso-

Example 10

A solution of 13.2 parts of 1,7-diamino-4-oxaheptane and 20.2 parts of triethylamine in 120 parts dry benzene is added slowly with stirring and cooling to a solution of 46.4 parts of 3-(m-cyanophenyl)-2-bromoacrylonitrile in 300 parts benzene. The reaction is maintained at 0–5° C. After stirring for three days at room temperature, the precipitated triethylamine hydrobromide is filtered off, the filtrate is concentrated in vacuo and the residue recrystallized from cyclohexane. The nuclear magnetic resonance and infrared spectra correspond to the structure 1,7-bis[2-cyano-3-(m-cyanophenyl)aziridin-1-yl]-4-oxaheptane.

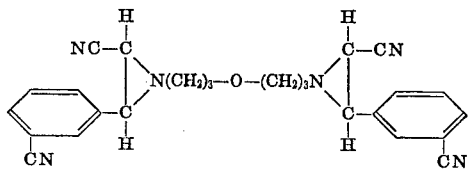

Example 11

A solution of 11.4 parts of 1,3-diaminocyclohexane and 20.2 parts of triethylamine in 120 parts dry benzene is added slowly with stirring and cooling to a solution of 52 parts of 3-(α-naphthyl)-2-bromoacrylonitrile in 300 parts benzene. The reaction is completed and the product recovered as described in Example 10. The nuclear magnetic resonance and infrared spectra correspond to the structure 1,3-bis[2 - cyano-3-(α-naphthyl)aziridin-1-yl]-cyclohexane.

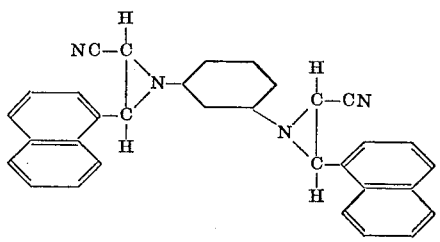

Example 12

Example 7 is repeated substituting 7.2 parts of 1,7-diamino-4-thiaheptane-4,4-dioxide for the 1,7 - diamino-4-thiaheptane. The resulting product has infrared and nuclear magnetic resonance spectra consistent with the structure 1,7-bis(2-p-nitrophenyl - 3 - cyanoaziridin-1-yl)-4-thiaheptane-4,4-dioxide

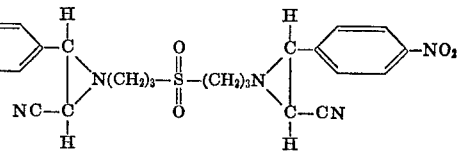

Examples 13–17

Example 3 is repeated substituting various acetophe-

TABLE I

| Example | Acetophenone | Parts | Product |
| --- | --- | --- | --- |
| 13 | 2-naphthyl-m-bromoacetophenone | 40 | 1,6-bis[2-(m-bromobenzoyl)-3-(2-naphthyl)-aziridine-1-yl]hexane. |
| 14 | p-Nitrobenzalacetophenone | 61 | 1,6-bis[2-benzoyl-3-(p-nitrophenyl)arizidine-1-yl]hexane. |
| 15 | o-Chlorobenzal-p-cyanoacetophenone | 64 | 1,6-bis[2-(p-cyanobenzoyl)-3-(o-chlorophenyl)-aziridine-1-yl]hexane. |
| 16 | p-tert-Butylbenzalacetophenone | 64 | 1,6-bis[2-benzoyl-3-(p-tert-butylphenyl)-aziridine-1-yl]hexane. |
| 17 | p-Carbomethoxybenzalacetophenone | 64 | 1,6-bis[2-benzoyl-3-(p-carbomethoxyphenyl)-aziridine-1-yl]hexane. | nance and infrared spectra are those expected of 4,4'-bis(2-carboethoxy-aziridin-1-yl)dicyclohexylmethane.

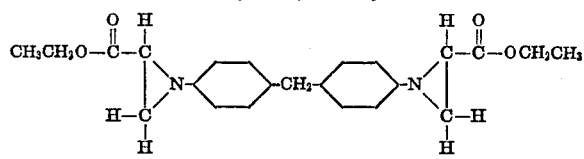

nones for the benzalacetophenone. In each case the product has an infrared and nuclear magnetic resonance spectra consistent with the expected substituted bis-aziridine. The specific acetophenone used, the amount and the product are tabulated in Table I.

Examples 18–21

Example 6 is repeated substituting various 2-bromo acrylic acid esters for the methyl-2-bromoacrylate. In each case the product has an infrared and nuclear magnetic resonance spectra consistent with the expected substituted bis-aziridine. The specific 2-bromoacrylic acid ester, the amount used, the product obtained and nitrogen analysis are tabulated below in Table II.

What I claim and desire to protect by Letters Patent is:
1. A bis-aziridinyl of the formula

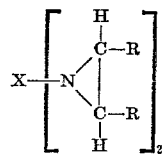

TABLE II

| Example | 2-bromoacrylic acid ester | Parts | Product | Nitrogen analysis (percent) | |
|---|---|---|---|---|---|
| | | | | Calculated | Found |
| 18 | Isopropyl-2-bromoacrylate | 46.3 | α,α'-Bis(2-carboisopropoxyaziridin-1-yl)-m-xylene | 7.79 | 8.45 |
| 19 | n-Butyl-2-bromoacrylate | 49.2 | α,α'-Bis(2-carbo-n-butoxyaziridin-1-yl)-m-xylene | 7.30 | 6.90 |
| 20 | 2-ethylhexyl-2-bromoacrylate | 63.0 | α,α'-Bis[2-carbo(2-ethylhexoxy)-aziridin-1-yl]-m-xylene | 5.60 | 5.05 |
| 21 | n-Decyl-2-bromoacrylate | 70.0 | α,α'-Bis(2-carbo-n-decoxyaziridin-1-yl)-m-xylene | 5.03 | 5.42 |

Example 22

A mixture of 10.2 parts of 2,2-dimethyl-1,3-propanediamine and 20.2 parts of triethylamine in 120 parts of dry benzene is added slowly with stirring and cooling to a solution of 26.4 parts of 2-bromoacrylonitrile, the temperature being maintained below 5° C. After stirring for 6 days at room temperature, the precipitated triethylamine hydrobromide is filtered and the solvent removed in vacuo. There remains 20.5 parts of a material which has the expected infrared and nuclear magnetic resonance spectra for 2,2-dimethyl-1,3-bis(2-cyanoaziridin-1-yl)propane.

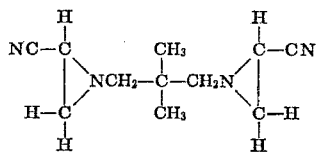

Examples 23–25

Example 22 is repeated substituting various diamino compounds for the 2,2-dimethyl-1,3-propanediamine. In each case the product has an infrared and nuclear magnetic resonance spectra consistent with the expected substituted bis-aziridine. The specific diamino compound, the amount used and the product obtained are tabulated below in Table III.

where X is an organic radical selected from the group consisting of alkylene, cycloalkylene, alkylene-cycloalkylene-alkylene, cycloalkylene - alkylene-cycloalkylene-alkylene-amino-alkylene, alkylene-thio-alkylene, alkylene-sulfone-alkylene, alkylene-oxy-alkylene and alkylene-aryl-alkylene radicals containing from 2 to 20 carbon atoms, at least one R in each aziridinyl ring is an electron withdrawing group selected from carboalkoxy, aroyl, cyano, alkaryl, aryl and aryl radicals substituted with halogen, nitro, cyano or carboalkoxy substituents and the second R is hydrogen or one of said electron withdrawing groups, said cycloalkylene radicals containing from 4 to 6 carbon atoms, said aryl radicals containing 1 to 2 carbocyclic rings and the alkyl substituents of said carboalkoxy radicals containing 1 to 10 carbon atoms.

2. The composition of claim 1 wherein X is alkylene.

3. The composition of claim 1 wherein one R in each aziridinyl ring is cyano and the other R is hydrogen.

4. The composition of claim 1 wherein one R in each aziridinyl ring is carboalkoxy and the other R is hydrogen.

5. The composition of claim 1 wherein one R in each acrylic acid esters for the methyl-2-bromoacrylate. In each

TABLE III

| Example | Diamino compound | Parts | Product |
|---|---|---|---|
| 23 | 1,10-diamino decane | 17.2 | 1,10-bis(2-cyanoaziridin-1-yl)decane. |
| 24 | 1,7-diamino-4-methyl-4-azaheptane | 14.5 | 4-methyl-1,7-bis(2-cyanoaziridin-1-yl)-4-azaheptane. |
| 25 | p-Xylylene diamine | 13.6 | α,α'-Bis(2-cyanoaziridin)-p-xylene. |

References Cited

Kyburz et al., Helv. Chim. Acta, Vol. 49, pp. 359–369 (1966).

JOSEPH A. NARCAVAGE, Primary Examiner

U.S. Cl. X.R.

260—94.6, 94.9 GB

UNITED STATES PATENT OFFICE
CERTIFICATE OF CORRECTION

Patent No. 3,828,024  Dated August 6, 1974

Inventor(s) David S. Breslow (Case 56-63)

It is certified that error appears in the above-identified patent and that said Letters Patent are hereby corrected as shown below:

Column 5, Table 1 entitled Parts,

"40" should read -- 81 --.

Claim #5 reads "The composition of claim 1 wherein one R in each acrylic acid esters for the methyl-2-bromoacrylate. In each"

should read

--The composition of claim 1 wherein one R in each aziridinyl ring is benzoyl and the other R is phenyl.--

Signed and sealed this 29th day of October 1974.

(SEAL)
Attest:

McCOY M. GIBSON JR.
Attesting Officer

C. MARSHALL DANN
Commissioner of Patents